Jan. 25, 1966  J. F. RYE  3,231,187
SPORT CAR RALLY COMPUTER
Filed Aug. 3, 1964  2 Sheets-Sheet 1

INVENTOR.
John F. Rye
BY
Fulwider, Patton, Rieber, Lee & Utecht
ATTORNEYS

Jan. 25, 1966   J. F. RYE   3,231,187
SPORT CAR RALLY COMPUTER

Filed Aug. 3, 1964   2 Sheets-Sheet 2

INVENTOR.
John F. Rye
BY
Fulwider, Patton, Rieber, Lee & Utecht
ATTORNEYS

United States Patent Office 3,231,187
Patented Jan. 25, 1966

3,231,187
SPORT CAR RALLY COMPUTER
John F. Rye, 646 Southwind, El Centro, Calif.
Filed Aug. 3, 1964, Ser. No. 386,928
2 Claims. (Cl. 235—61)

The present invention relates to a computer, and more particularly to a computer to be used by the participant in a sport car rally.

In the sport of sport car rally, the driver of an entry is directed through a defined course, which course is described in writing. The first direction to the driver is to check a true distance, outlined in the course, with the odometer reading of the car he is driving. Usually the car odometer is inaccurate, and therefore computation must be effected.

The computer of the present invention includes a frame which supports three rotatable visible indicators, one of which is in the form of an interval-of-time indicator having a face corresponding to the face of a clock and having a second hand and a minute hand, the latter being connected with the second hand through gearing as in a clock. The other two indicators are in the form of counters.

A cone-shaped element is rotatably supported on the frame and is directly connected with the interval-of-time indicator. Means in the form of a wheel is shiftable toward and away from the base of the cone with the periphery of the wheel in engagement with the periphery of the cone-shaped element. This wheel, when rotated, operates a counter indicating mileage. By rotating the cone to simulate a given miles-per-hour speed, the counter will indicate the correct distance traveled, and the interval-of-time indicator will indicate the time elapsed for the distance traveled.

Inasmuch as automobile odometers are quite often, and usually are inaccurate, the aforementioned counter is geared to the second counter so as to operate the second mentioned counter at a rate at which the automobile odometer is actuated. By turning the cone-shaped element to simulate a given miles per hour for a distance measured by the automobile odometer, a correct time interval for a given distance is indicated by the interval-of-time indicator.

Other features and the advantages of the present invention will be apparent from the following description, reference, reference being had to the accompanying drawings, wherein a preferred embodiment of the invention is illustrated.

Figure 1:
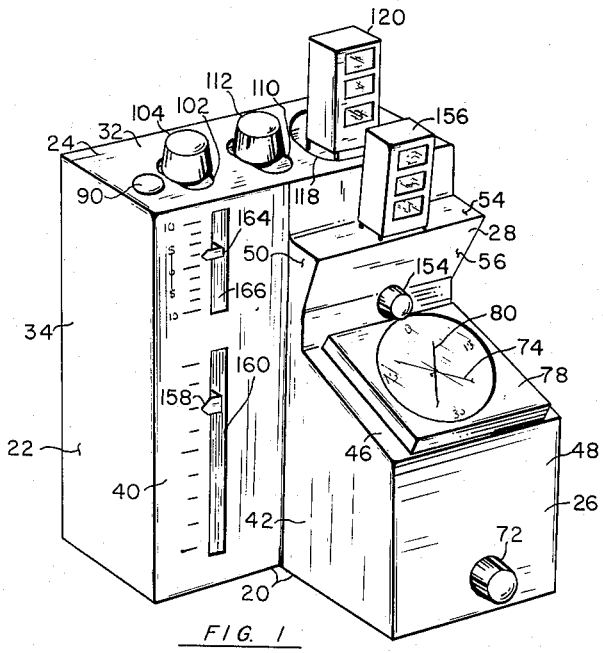
Figure 2:
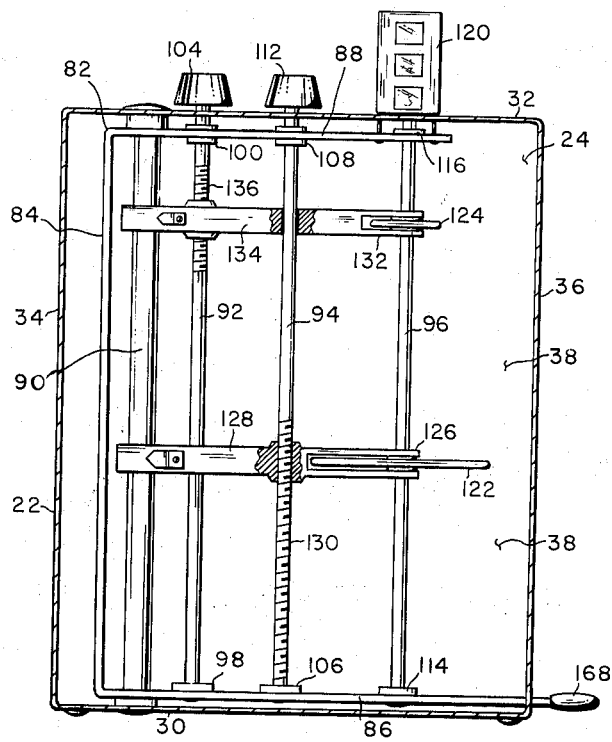
Figure 3:
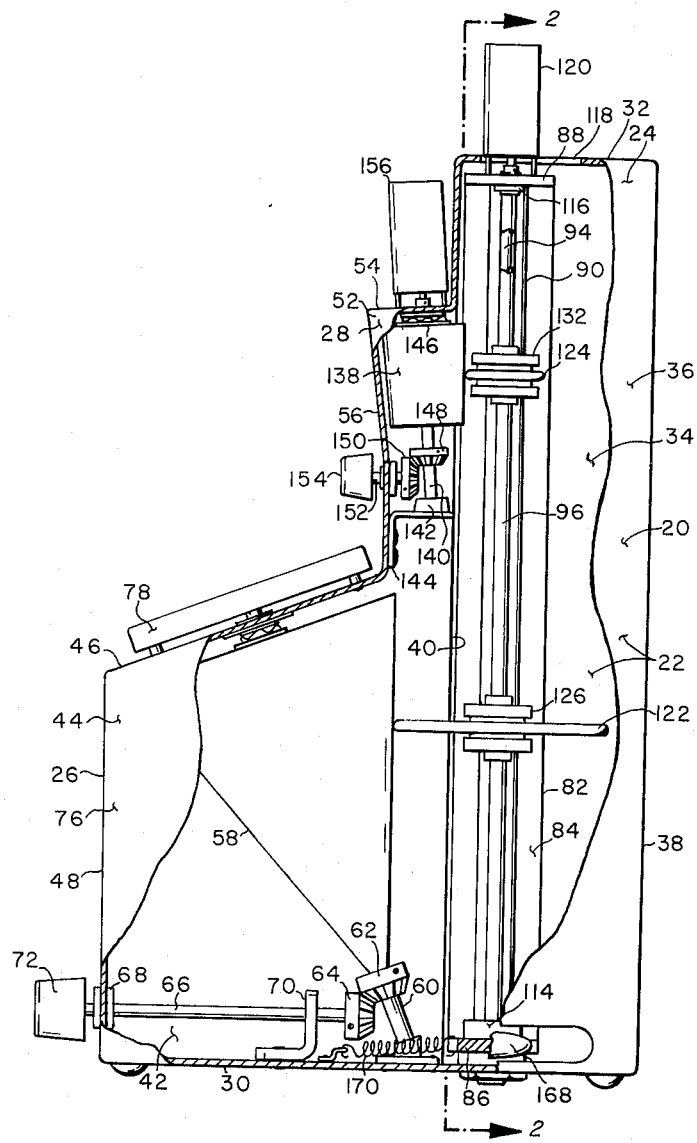

FIG. 1 is a perspective view of the computer;
FIG. 2 is a sectional view taken along line 2—2 of FIG. 3, but on a smaller scale; and
FIG. 3 is a side view of the computer, part thereof being shown in section.

Referring more in detail to the drawings, the computer is shown at 20. It includes a frame in the form of a housing 22, including a rear upright section 24, a lower front section 26 and an upper front section 28. The housing includes a bottom wall 30; the top wall, the side walls and the rear wall of the rear section are indicated, respectively, at 32, 34, 36 and 38. The lower front section 26 and the upper front section 28 of the housing form a part of the front of the rear section 24; the remainder of the front section is indicated at 40.

The side walls and the top and front walls of the lower front section are shown at 42, 44, 46 and 48, respectively. The side walls and the front top walls of the upper front section are shown at 50, 52, 54 and 56, respectively.

A cone-shaped element, hereinafter referred to as cone 58, is rotatably carried by a shaft 60, which shaft is suitably journaled in the bottom wall 30 and the top wall 46 of the front section 26. A beveled gear 62 is fixed to shaft 60, which gear meshes with another beveled gear 64 which is fixed on a shaft 66. The shaft 66 is journaled for rotation in a bearing 68 in the front wall 48 of lower front section 26 and also in a bearing formed by a bracket 70 which is fixed to the bottom wall 30. The shaft 66 extends through the front wall and carries a knob 72 at the front end thereof. Turning of the knob causes rotation of the cone 58.

Shaft 60 extends through the journal in the top wall 46 of the front section 26 and is directly connected with the second hand 74 of an interval-of-time indicator 73. A minute hand 80 is suitably geared through clock mechanism. Inasmuch as such reduction gearing is standard in clock mechanism, such is not shown herein.

A C-shaped frame 82, including an upright section 84, a lower leg 86 and an upper leg 88 is journaled, for oscillatory movement, in the rear section 24 of the frame, on a vertically extending pin 90. The frame 82 therefore forms a lever. This lever carries three vertically extending shafts 92, 94 and 96. Shaft 92 is suitably journaled for rotation in bearings 98 and 100 in the lower 86 and upper 88 legs of the lever 82. It extends through a slot 102 in the top wall 32 of rear section 24 and has a knob 104 fixed thereto. Shaft 94 is journaled for rotation in bearings 106 and 108 in the lower and upper legs of the lever 82. It also extends through a slot 110 in the top wall 32 and has a knob 112 fixed thereto. Shaft 96 is journaled for rotation in bearings 114 and 116 in legs 86 and 88 of lever 82. It also extends through a slot 118 in top wall 32 and carries an indicator 120 in the form of an odometer counter. The frame of the odometer 120 is prevented from rotation, however, rotation of the shaft 96 causes rotation of the counter wheels (not shown) of a standard odometer.

Two wheels 122 and 124 are mounted for rotation with and are vertically slidable on the shaft 96. Wheel 122 is carried between the fingers 126 of a bifurcated, vertically movable and horizontally extending arm 128. The left end of the arm, as viewed in FIG. 2, is drilled to receive and is guided by the pin 90. The arm is threaded intermediate the wheel 122 and pin 90 for cooperation with the threads 130 on shaft or screw 94. By turning knob 112 on screw 94, the vertical position of the arm 128 and wheel 122 can be adjusted. The knob 112 must be turned for raising or lowering the wheel.

Wheel 124 is carried between two fingers 132 of a bifurcated arm 134. The left end of arm 134 is drilled to receive and is guided by pin 90. Arm 134 is threaded for cooperation with the threads 136 on shaft or screw 92. Turning of shaft 92 by knob 104 effects vertical adjustment of arm 134 and wheel 124. The knob must be turned in order to raise or lower the wheel 124. The arm 134 is drilled for receiving screw 94 and for free sliding movement thereof relative to the screw. Similar drilling is made in arm 128 for receiving and for free sliding movement of the arm 128 relative to screw 92.

A cone-shaped element, hereinafter referred to as cone 138, is fixed to a shaft 140 which shaft is journaled for rotation in a bearing 142 carried by a bracket 144, the latter being fixed to the front of the upper front section 28, and in a bearing 146 attached to the underside of top wall 54 of section 28. A beveled gear 148 is fixed to shaft 140 and meshes with a beveled gear 150 fixed to a shaft 152. Shaft 152 is journaled for rotation in a suitable bearing in front wall 56. It extends through the front wall and has a knob 154 fixed to the outer end thereof. Rotation of the knob causes rotation of the cone 138 and shaft 140. The upper end of shaft 140 extends through the top wall 54 and rotates counter wheel (not shown) in an indicator in the form of a counter or odometer 156.

The peripheries of cones 58 and 138 are adapted to be engaged with the peripheries of wheels 122 and 124, respectively. The shaft 96 for the wheels 122 and 124, the shaft 60 for cone 58 and the shaft 140 for cone 138 are so disposed with respect to one another that contact relation is maintained between the peripheries of the wheels and the peripheries of the respective cone throughout vertical adjustments of the wheels toward and away from the bases of the cones.

Thus, it is apparent that by rotating the cone 58, as for example by knob 72, rotating movement will be imparted to shaft 96 through wheel 122 to rotate the counter wheels of counter 120 and rotate the counter wheels of counter 156 through wheel 124, cone 138 and shaft 140.

In operation, the height of wheel 122 is set, by turning knob 112, to the average speed per hour, directed for a certain section of the route. For example, if an average speed of thirty miles per hour is directed, the wheel is adjusted to a predetermined height which would be, for example, approximately midway of the base end and the opposite end of cone 58. The cone could bear indicia, for example, 0 to 65, if the housing had a window for observing the indicia. In the preferred embodiment, the arm carries an indicator finger 158 which extends through a slot 160 in the front 40 and which registers with numerals, for example, 0 to 65. If higher or lower than, for example, an average of thirty miles per hour is directed, the knob 112 is turned to raise or lower, respectively, the wheel 122. The true length of the certain section traveled, will be indicated by the odometer 120. However, if the odometer on the automobile is inaccurate, the reading of that odometer will of course be inaccurate. To overcome this inaccuracy, the actual distance to be observed can be translated to the reading of the automobile odometer by adjusting, i.e., either lowering or raising of the wheel 124 relative to the cone 138. The arm 134 is provided with an index finger 164 which extends through a slot 166 in the front wall 40 where it registers with indicia on the wall. After determining the percentage of error in the automobile odometer, the wheel 124 is shifted upwardly or downwardly, the indicia on the front indicating percentage for correction.

It is desirable to separate the wheels from the cones when the height of the wheel is to be adjusted. Therefore, the lower arm 86 of lever 82 is in the form of a handle 168, which when moved to the right in FIG. 3, moves the wheels away from the cones. A spring 170 is connected with the lever and normally yieldingly urges the wheels against the cones.

While the form of embodiment herein shown and described, constitutes preferred form, it is to be understood that other forms may be adopted falling within the scope of the claims that follow.

I claim:

1. A computer comprising in combination:
 (A) a frame;
 (B) a shaft rotatably carried by the frame;
 (C) a cone-shaped element on and rotatable with the shaft;
 (D) a knob for rotating the shaft;
 (E) a rotatable time interval indicator rotatable by the shaft;
 (F) a lever carried by the frame;
 (G) a shaft rotatably carried by the lever;
 (H) a counter rotatable by the second mentioned shaft;
 (I) a wheel element on the second mentioned shaft, said wheel element being rotatable with the periphery thereof in engagement with the periphery of the cone-shaped element throughout relative movements of the elements toward and away from the base of the cone-shaped element;
 (J) means for imparting shifting movements of one of said elements for effecting relative movements between said elements toward and away from the base of the cone-shaped element;
 (K) a third shaft, said third shaft being carried by the frame;
 (L) a rotatable counter, rotatable by the third mentioned shaft;
 (M) a cone-shaped element on and rotatable by the third mentioned shaft;
 (N) a knob for rotating the third mentioned shaft;
 (O) a second wheel element on the second mentioned shaft, said second wheel element being rotatable with the second mentioned shaft with the periphery thereof in engagement with the periphery of the second mentioned cone element throughout relative movements of the second mentioned element toward and away from the base of the second mentioned cone-shaped element;
 (P) means for imparting shifting movement of one of the second mentioned elements for effecting relative movements between said second mentioned elements toward and away from the base of the second mentioned cone-shaped element;
 (Q) and means connected with the lever for yieldingly urging the peripheries of the wheel elements against the peripheries, respectively, of the cone-shaped elements.

2. A computer comprising in combination:
 (A) a frame;
 (B) a shaft rotatably carried by the frame;
 (C) a cone-shaped element fixed to the shaft;
 (D) a knob for rotating the shaft;
 (E) a rotatable time interval indicator fixed to the shaft;
 (F) a lever carried by the frame;
 (G) a shaft rotatably carried by the lever;
 (H) a counter rotatably carried by the second mentioned shaft;
 (I) a wheel on the second mentioned shaft, said wheel being rotatable with and movable longitudinally of the second mentioned shaft with the periphery thereof in engagement with the periphery of the cone-shaped element;
 (J) means for shifting the wheel longitudinally of the second mentioned shaft and toward and away from the base of the cone-shaped element;
 (K) a third shaft rotatably carried by the frame;
 (L) a rotatable counter fixed to the third mentioned shaft;
 (M) a cone-shaped element fixed to the third mentioned shaft;
 (N) a knob for rotating the third mentioned shaft;
 (O) a second wheel on the second mentioned shaft, said wheel being rotatable with and movable longitudinally of the second mentioned shaft with the periphery thereof in engagement with the periphery of the second mentioned cone-shaped element;
 (P) means for shifting the second mentioned wheel longitudinally of the second mentioned shaft and toward and away from the base of the second mentioned cone-shaped element;

(Q) and means connected with the lever for yieldingly urging the peripheries of the wheels against the peripheries of the cone-shaped elements.

References Cited by the Examiner
UNITED STATES PATENTS

| | | |
|---|---|---|
| 801,833 | 10/1905 | Allen. |
| 825,363 | 7/1906 | Vermehren. |
| 1,112,459 | 10/1914 | Lea _____ 235—61 |
| 1,952,303 | 3/1934 | Bartholomew _____ 235—61 |
| 2,116,508 | 5/1938 | Colvin _____ 235—61 |
| 2,599,055 | 6/1952 | Heckard et al. _____ 235—61 |
| 2,743,867 | 5/1956 | Gervais _____ 235—61 |
| 2,911,144 | 11/1959 | Lee et al. _____ 235—61 |

FOREIGN PATENTS 903,263  9/1945  France.

LEO SMILOW, *Primary Examiner.*

C. G. COVELL, *Assistant Examiner.*